June 5, 1928.　　　　　　　　　　　　　　　　1,672,159
J. S. IMLACH
PRECISION TOOL
Filed June 10, 1922　　　　4 Sheets-Sheet 1
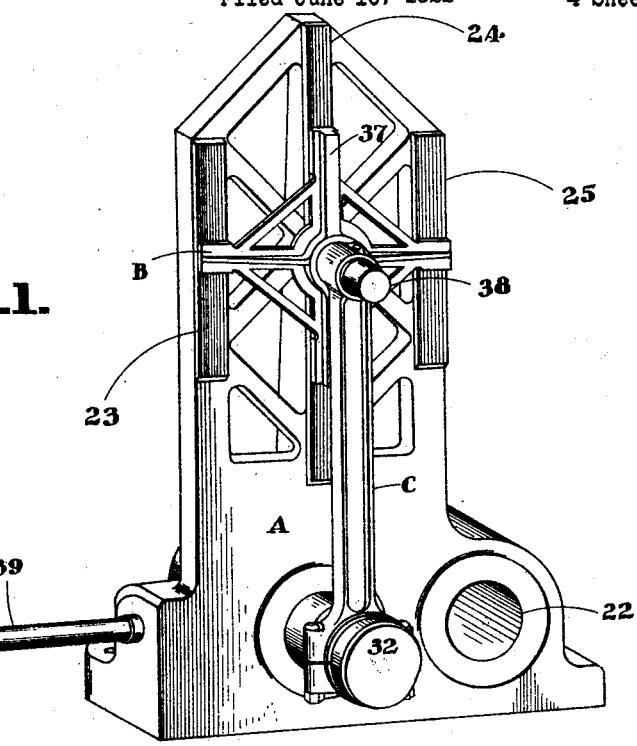
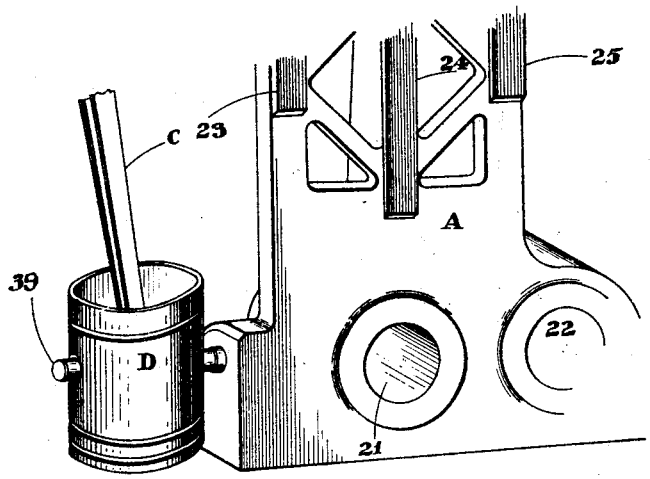
INVENTOR.
John Stevenson Imlach INVENTOR.
John Stevenson Imlach.

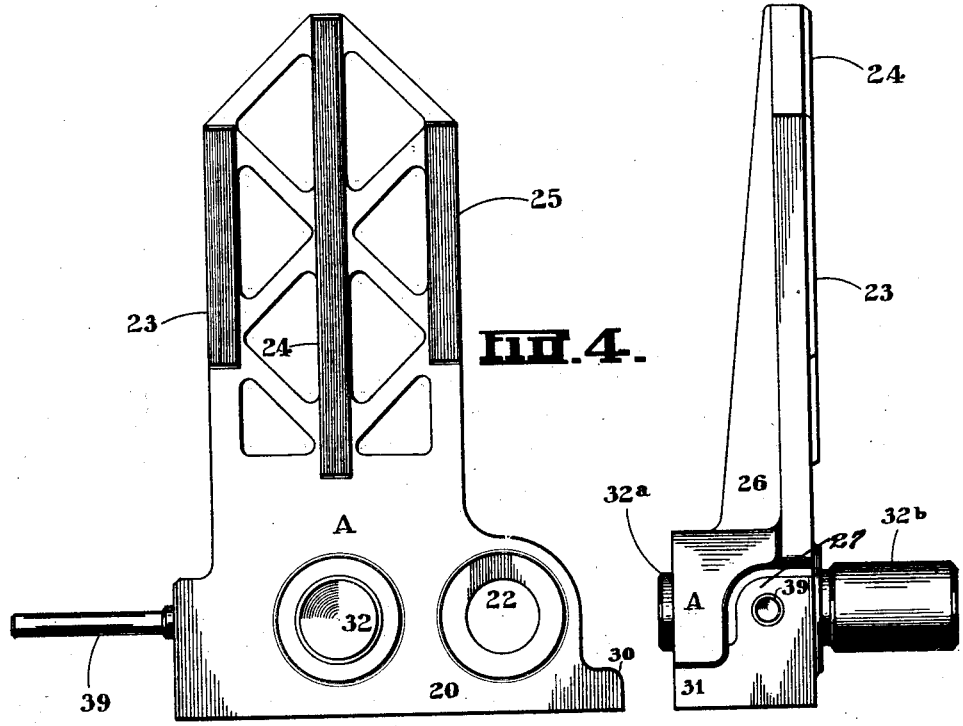
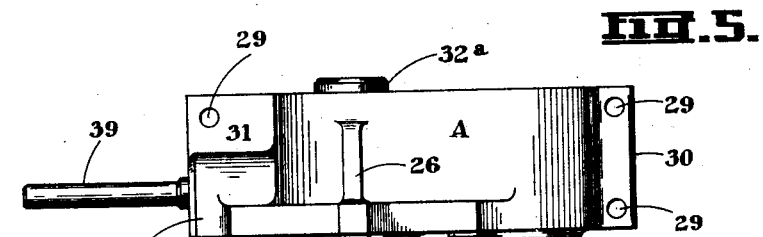
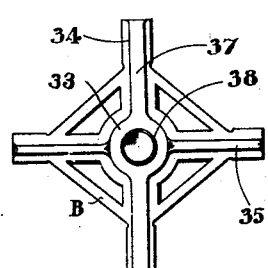
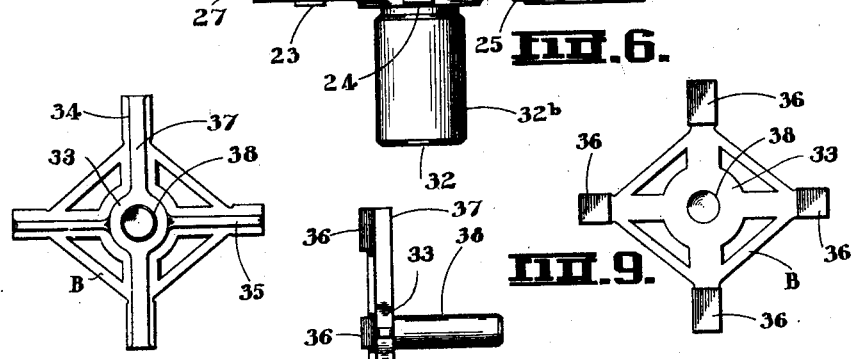
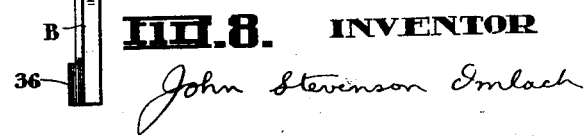

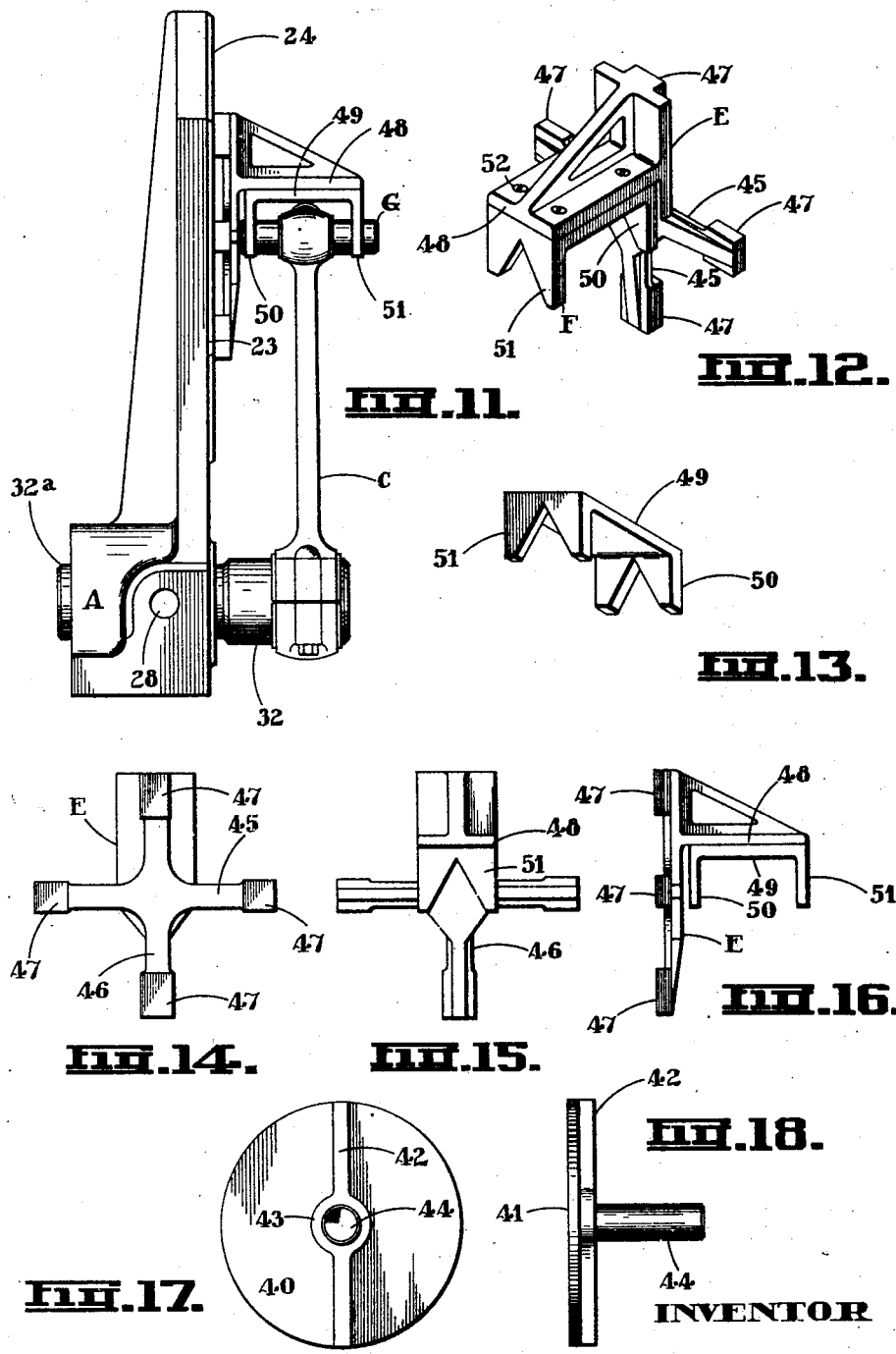

Patented June 5, 1928.

1,672,159

UNITED STATES PATENT OFFICE.

JOHN STEVENSON IMLACH, OF OTTAWA, ONTARIO, CANADA.

PRECISION TOOL.

Application filed June 10, 1922, Serial No. 567,470, and in Canada December 6, 1921.

The subject matter forming this application relates to precision tools and comprehends the provision of a tool of that character adapted for testing the alignment of internal combustion engine connecting rods.

That misaligned connecting rods are detrimental to the actuation of internal combustion engines is obvious. Wear on cylinder walls, pistons, rings, wrist pins, also oil pumping and piston slapping is incidental to this inaccuracy.

It is apparent that mechanical equipment is necessary for appropriate and accurate testing of connecting rods to assure the true alignment essential for perfect actuation of motors. Therefore, it is within the province of the disclosure to provide a tool of the character described adapted for expediently and efficaciously testing connecting rods and for the subordinate operations herein described.

The principal object of my invention is to provide a precision tool of the character described which multiplies the visible extent of error in the connecting rod, and which permits light to strike the coinciding gauge surfaces, thus enabling the operator to readily ascertain the direction and extent of error without the use of feelers.

A further object of my invention is to provide a precision tool of the character described capable of testing connecting rods of various sizes with equal accuracy.

A further object of my invention is to provide in a precision tool of this character, means for holding the tested connecting rod to undergo the twisting operation required to render the connecting rod true, the possibility of distorting the gauge surfaces thereof being obviated.

A further object of my invention is to incorporate with a tool embodying the aforementioned characteristics, a piston supporting mandrel adapted to support the piston to permit expedient disconnection of the connecting rod therefrom.

A further object is to provide in a precision tool of the character described, an indicator embodying means for testing the angularity of the wrist pin bore of the piston in relation to the vertical axis of the piston and for detecting wear on the inner surface of the bore referred to.

A further object of my invention is to provide in a precision tool of this character, an indicator of modified form capable of expediently testing the angularity of the connecting rod wrist pin in relation to the crank shaft bore of the connecting rod, and of detecting any wrist pin attrition.

A further object is to provide such an indicator capable of testing wrist pins and connecting rods of various sizes with equal accuracy.

Among the aims and object of my invention residing in the disclosure may be cited the provision of a precision tool of the character described with a view to compactness and durability, wherein the number of parts are few, the construction simple and cost of production low.

The novelty, construction and operation of my invention will be readily comprehended by a perusal of the ensuing description taken in conjunction with the subjoined schematic illustrations, wherein:

Figure 1 is a perspective view illustrating a precision tool constructed in accordance with my invention, also showing the disposition of the connecting rod while being tested.

Figure 3 is a fragmentary perspective view showing a portion of the gauge frame of the precision tool and the disposition of the piston and connecting rod as the same would be held while the connecting rod is disconnected from the piston.

Figure 4 is a front elevation of the precision tool gauge frame.

Figure 5 is a side elevation thereof.

Figure 6 is a top plan thereof.

Figure 7 is a front elevation of the indicator forming a part of the precision tool.

Figure 8 is a side elevation thereof.

Figure 9 is a rear elevation thereof.

Figure 11 is a side elevation showing a gauge frame and a modified form of indicator, also the disposition a connecting rod and wrist pin would assume while being tested.

Figure 12 is a perspective view showing the modified form of indicator shown in Figure 11.

Figure 13 is a similar view showing the gauge element of the modified form of indicator referred to.

Figure 14 is a rear elevation of the modified form of indicator.

Figure 15 is a front elevation thereof.

Figure 16 is a side elevation thereof.

Figure 17 is a front elevation of another form of indicator.

Figure 18 is a side elevation thereof.

Figure 2:
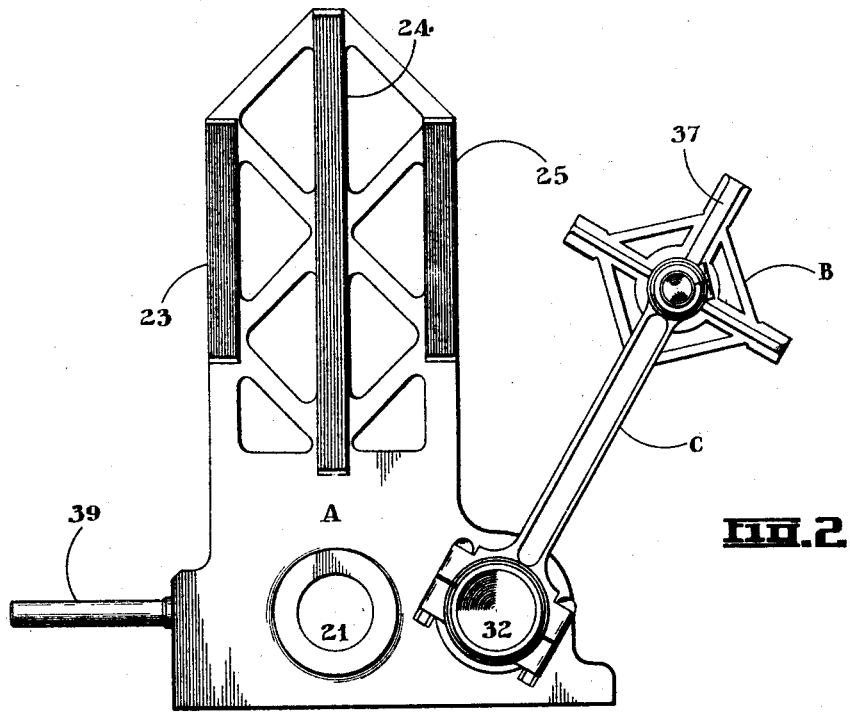
Figure 2 is a front elvation of the precision tool showing the disposition of the connecting rod as the same would be twisted to render the connecting rod true.

The principal function as well as a number of the subordinate functions of my invention are performed by two individual elements which are combined for the purposes referred to. The gauge frame, denoted in its entirety by A, is employed to support the connecting rod to be tested, while the indicator, denoted in its entirety by B, and adapted to contact with the gauge frame A, is supported by the connecting rod carried by the gauge frame. The guage frame is cast integrally and constitutes a base 20 through which the aligned mandrel perforations 21 and 22 extend. The gauge frame extending vertically from the base 20 is perforated to permit the maximum amount of light to strike the finished gauge surfaces 23, 24 and 25. The web 26 is formed at the rear of the gauge surface 24 to strengthen the frame.

The numeral 27 denotes a boss formed on one side of the base. A perforation 28 is disposed in the said boss for the purpose hereinafter described.

The vertical perforations 29 extending through the relatively thin poritions 30 and 31 of the base are provided for the reception of bolts adapted to secure the gauge frame to a work bench or other supporting means.

The numeral 32 denotes a mandrel which extends through one of the perforations 21 or 22 as required to perform a certain operation. It is obvious that the portion 32$^a$ of the mandrel is always the same diameter to assure a tight fit in the mandrel perforations. The portion 32$^b$, will however, be of such diameter as will comply with the diameters of the crank shaft bores of the connecting rods to be tested.

The indicator illustrated in Figures 7, 8 and 9 comprises a hub 33, provided with integral arms 34 and 35 which cross at right-angles. Finished gauge surfaces 36 are formed on the outer ends of the said arms. The arm 34 is provided with a continuous gauge surface 37 which extends the full diameter of the indicator and is in the same plane as the gauge surfaces 36. The arbor 38 extending through the hub at right-angles to the vertical plane of the gauge surfaces is substantially seated therein.

Similarly to the gauge frame, the indicator is perforated to permit the maximum amount of light to strike the gauge surfaces thereof.

In Figure 1 I have illustrated the disposition of a connecting rod while being tested. The said connecting rod denoted in its entirety by C is mounted upon the portion 32$^b$ of the mandrel, while the arbor 38 of the indicator extends through the wrist pin bore in the adjacent extremity thereof. The mandrel is extended into the perforation 21 until the gauge surfaces 36 coincide with the gauge surfaces 23, 24 and 25 of the gauge frame. It is obvious that if all the gauge surfaces are contiguous the alignment of the connecting rod is true. If found otherwise, the mandrel may be removed and disposed in the perforations 22 as illustrated in Figure 2 so that the connecting rod may be twisted to render the same true. It is apparent that when the mandrel is supported in the perforation 22 the possibility of distorting the gauge frame is greatly reduced.

The numeral 39 denotes a mandrel adapted to seat in the perforation 28 formed in the boss 27. The said mandrel is employed to support pistons and connecting rods as illustrated in Figure 3. The mandrel passes through the perforation formed in the wrist pin and is interchangeable to comply with such perforations of various diameters.

Supporting means of this character obviates the necessity of employing a vise or the like for holding the connecting rod to permit disconnection from the piston. The use of such supporting means is very convenient and obliterates the possibility of accidently distorting the connecting rod.

Figure 10:
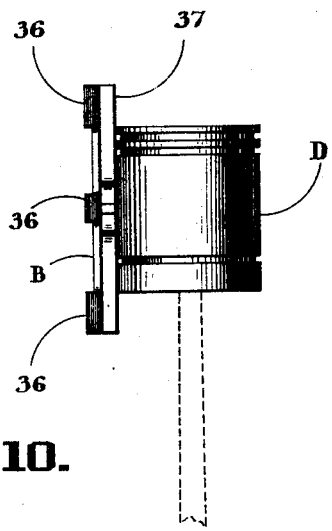
Figure 10 is a fragmentary side elevation showing an indicator and the disposition of a piston while testing the angularity of the wrist pin bore of the piston in relation to the vertical axis of the piston, also for detecting any wrist pin attrition.

In Figure 10 I have illustrated the method of detecting wrist pin bore attrition. The arbor 38 of the indicator is disposed in the wrist pin bore of the piston D, while the periphery thereof coincides with the continuous gauge surface 37 of the indicator. Any existing attrition may be readily detected by ascertaining the relation of the periphery of the piston with the continuous gauge surface 37.

In Figures 17 and 18 I have illustrated an indicator which may be manufactured at a very low cost and yet prove adequate in many ways. The said indicator constitutes a circular disk 40 provided with a finished gauge surface 41 and having a continuous gauge surface 42 extending transversely thereof for the purpose of testing pistons as previously described. A hub 43 is configurated centrally of the disc 40 and supports an arbor 44. This indicator is used in a similar manner to the indicator referred to in the prior elucidation.

In Figures 11 and 16 consecutively I have shown a form of indicator which may be used for testing connecting rods of various sizes with equal accuracy, thereby obviating the necessity of using a different sized indicator for each respective size of connecting rod.

The gauge frame with this form of indicator is similar to the gauge frame previously described.

The present form of indicator constitutes two individual elements denoted in their entirety by E and F. The element E is cast integrally and comprises the arms 45 and 46 having finished gauge surfaces 47 formed on the ends thereof. A bracket 48 extends at right-angles from the said arms and is employed to support the gauge element F which is preferably formed of channel steel. The said gauge element F constitutes a horizontal portion 49 which abuts with the bracket 48, and the right-angularly disposed serrated extremities 50 and 51. The said element is secured to the bracket 48 by a plurality of screws 52. While this construction is deemed preferable, I may cast the gauge element integrally with the bracket 48.

The connecting rod to be tested is supported by the mandrel 32. The serrated extremities of the gauge element straddle the wrist pin G of the connecting rod and the gauge frame 47 coincides with the gauge surface 24 of said frame. It is obvious that the extent of error in the connecting rod may be readily detected by ascertaining the relation of the gauge element with the wrist pin and the coincidence of the gauge surfaces.

While it is believed that from the foregoing description the construction and operation of my invention will be readily comprehended, I desire to have it understood that the same is merely illustrative of the preferred construction of my invention to which I do not wish to limit myself, and that deviations from such detail may be resorted to as do not form a departure from the spirit and scope of my invention.

I claim:

1. In a device of the character described and in combination, a gauge frame having multiple gauge surfaces in the same plane, mandrel means in the frame at right angles to said surfaces and adapted to support the work, and a gauge head provided with gauge surfaces on opposite sides and adapted to be mounted in a predetermined position on the work supported on said mandrel.

2. In a precision tool, a gauge frame formed with a solid base, a skeleton portion integral with said frame and provided with vertically spaced gauge surfaces of unequal length in the same plane, mandrel means in the frame adapted to support the work, and an indicator provided with gauge surfaces and adapted to be mounted in a predetermined position on the work supported by said mandrel and to contact with the frame gauge surfaces.

3. In a precision tool and in combination a gauge frame formed with a solid portion and a skeleton portion, there being multiple gauge surfaces in the same plane on the skeleton portion, a mandrel in the frame at right angles to the gauge surfaces and adapted to support the work, an indicator adapted to be mounted in a predetermined position on the work supported by said mandrel, and an arbor for the indicator there being gauge surfaces on the indicator in a plane at right angles to the axis of the arbor to engage with the frame gauges.

4. In a precision tool of the character described and in combination, a frame formed with a solid base, a mandrel bearing in said base adapted to support the work, there being multiple gauge surfaces of varying length on the frame in the same plane, and a multiple point indicator provided with gauge surfaces adapted to contact with the frame gauge surfaces and adapted to be mounted in a predetermined position on the work supported by said mandrel.

In witness whereof I have hereunto set my hand.

JOHN STEVENSON IMLACH.